Feb. 10, 1931. C. F. OSGOOD 1,791,744
HOIST APPARATUS
Filed March 17, 1924 2 Sheets-Sheet 2

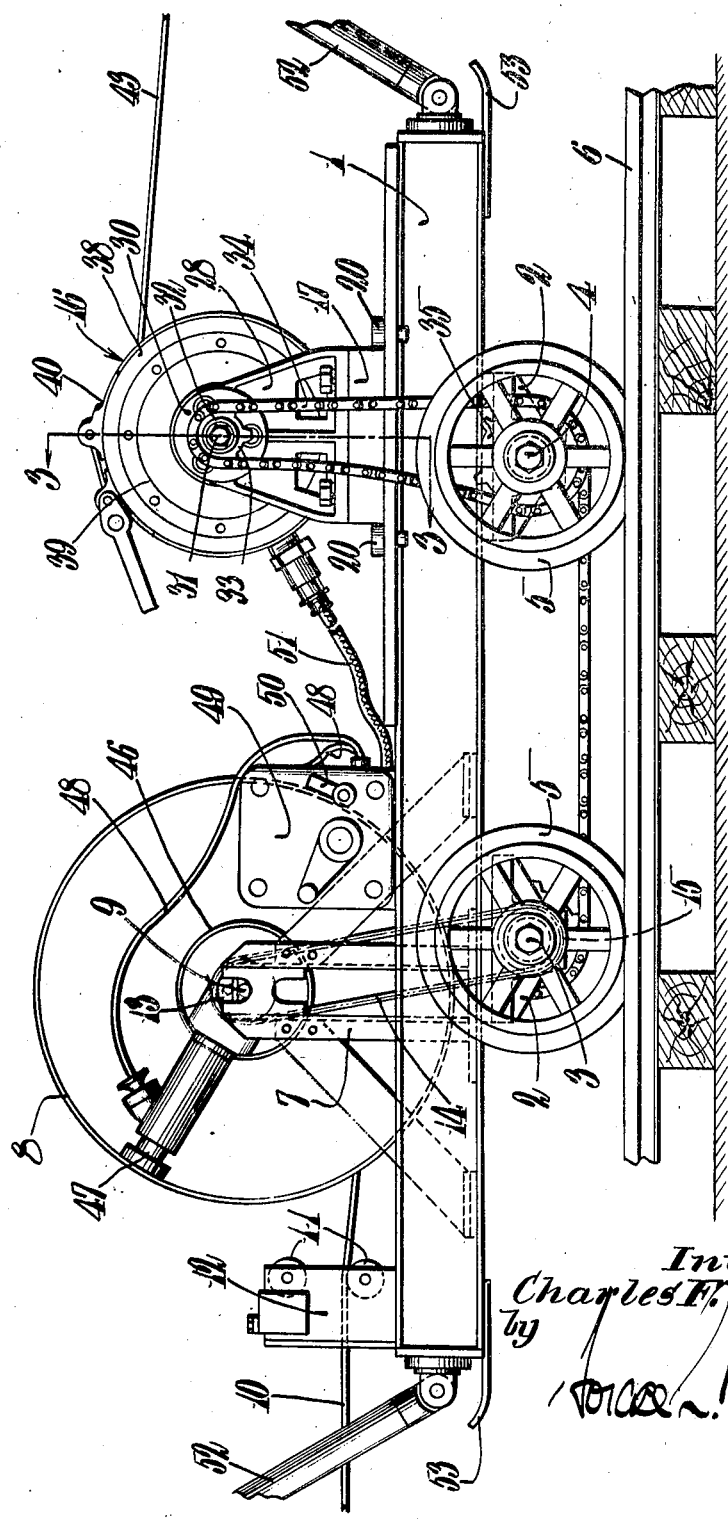

Patented Feb. 10, 1931

1,791,744

UNITED STATES PATENT OFFICE

CHARLES F. OSGOOD, OF CLAREMONT, NEW HAMPSHIRE, ASSIGNOR TO SULLIVAN MACHINERY COMPANY, A CORPORATION OF MASSACHUSETTS

HOIST APPARATUS

Application filed March 17, 1924. Serial No. 699,636.

This invention relates to hoist apparatus, and more particularly to a portable hoist outfit.

It has for its object to provide an improved portable hoist mechanism. A further object is to provide an improved hoist mechanism adapted to be run around a mine upon a track. A further object is to provide an improved portable outfit having a hoisting mechanism thereon and especially adapted to use as a scraper or loading mechanism. A still further object is to provide improved driving means between said hoisting mechanism and the wheels upon which said outfit is mounted. Another object is to provide a truck having an electric cable reel and hoisting mechanism thereon, with improved means for driving said truck from said hoisting mechanism. My improved device also contemplates the use of a hoisting mechanism, in combination with the previously mentioned driving mechanism for the truck, to assist in the moving of the truck, of a cable wound upon the drum means and anchored at some distant point, such a construction thus permitting the truck to be moved up relatively steep grades upon which the truck wheels would ordinarily slip. It is also an object of the invention to provide suitable means for anchoring the truck in position, and to provide improved means for disconnecting the driving connection between the truck wheels and the hoisting mechanism, and to thereafter use the hoisting mechanism in combination with the flexible member disposed thereon to operate a scraper such as in loading coal or other material into a mine car. A further object is to provide a suitable pivotal structure for the hoisting mechanism so that the same might be turned upon its truck base to drive the truck in the reverse direction, this of course only being necessary where a non-reversible motor is used for actuating the drum means.

In the accompanying drawings I have shown for purposes of illustration one form which my invention may assume in practice.

In these drawings,—

Fig. 1 is a side elevation of my improved outfit.

Fig. 2 is a right hand end elevation.

Fig. 3 is a vertical transverse section on line 3—3 of Fig. 1.

In the illustrative form of my invention, I have shown my improved outfit particularly adapted for scraper purposes as comprising a rectangular shaped truck frame 1 having depending bearings 2 within which are mounted rear and front axles 3 and 4 carrying wheels 5 adapted to run upon a track 6. Mounted upon the rear end and opposite sides of the truck frame 1 are upwardly extending standards 7 which carry an electric cable reel 8 rotatably mounted therein as by a transverse shaft 9 and from which a cable 10 is adapted to be reeled out over idler pulleys 11 carried in a suitable supporting bracket 12 at the extreme rear end of said truck frame. Disposed upon the shaft 9 is a sprocket 13 which can be connected thereto as by any suitable friction clutch means not shown, which in turn is driven by a chain 14 passing around a sprocket 15 fixed to the rear axle 3 so that upon movement of the truck in one direction the reel 8 will automatically unwind the cable 10 therefrom while upon movement in the opposite direction the same will be wound upon the reel. In this latter case the friction clutch between the sprocket 13 and shaft 9 will slip as the cable is wound upon the reel due to the increased diameter thereof but a continual driving action will be imparted to said reel.

In order to provide suitable driving means for the truck and to also assist in pulling the truck up a steep grade or to use the hoisting mechanism as a separate unit, I have provided on the front end of said truck a double drum hoist unit 16 which has a usual base 17 pivotally mounted upon the platform of the truck frame 1 as by any desired construction as shown herein, a circular flanged plate 18 is fixed to the base and disposed within an opening 19, the same being held in any desired position as by pins 20 removably mounted in any one of a series of holes formed in the floor of the truck frame. The hoisting mechanism is of standard construction and briefly described comprises a driving motor 21, herein shown as of an electric motor type but if desired could be of a fluid pressure actuated type, upon the periphery of which is mounted a drum 23 having a transverse member 24 and a stub shaft 25. The latter is rotatably mounted in bearings 26 disposed within the hollow portion of a stub shaft 27 in turn rotatably mounted in an end standard 28 suitably supported as by the base 17 of the hoist. Removably secured to the shaft 27, as by screws 29, is an end bracket 30 having an outwardly extending shaft 31 disposed coaxial with the drum axis and having slidably keyed thereon a longitudinally movable clutch member 32 adapted to be slid into driving engagement with a sprocket 33. The latter is otherwise freely rotatable on said shaft 31 and is operatively connected to the front axle 4 as by a chain 34 passing around a sprocket 35 fixed to said axle so that upon engagement of the clutch 32 and sprocket 33 the truck may be driven through suitable operative connections between the electric motor 21 and the remaining drum structure.

The connections above referred to comprises a suitable gear train, generally indicated at 36, some of which is mounted upon the transverse member 24 and adapted to mesh with an internal gear 37 mounted on an annular flange 38 removably secured to a radially flanged portion 39 carried by the shaft 27. The flange 38 carries usual brake bands 40 while an annular flange 41 formed on the drum also carries brake bands 42. Suitable means have been provided for transmitting electric current to the motor as from the cable 10, which means comprises a slip ring 46 carried on shaft 9 and adapted to be engaged by a suitable brush and plug structure 47 to which lead wires 48 are connected. These lead wires terminate in a controller box 49 so as to control either forward or reverse rotation of the electric motor, as by suitable mechanism controlled by a reverse lever 50. A cable 51 connects said control box and motor 21 and is of such length that upon swinging the hoist about its vertical pivot said connection will not have to be changed. Pivotally mounted upon the four corners of the truck frame are jacks 52 adapted to be thrown into engagement with the mine wall, roof, or other suitable stationary support when it is desired to positively anchor the truck frame, while upon movement of the truck, said members may be placed upon outwardly extending arms 53 which serve as jack carriers.

In the operation of my device if it is desired to drive the truck the brake band 40 will be left free and brake band 42 tightened to hold the drum 23 in fixed position thereby causing rotation of the internal gear 37 as through the gear train 36, thus causing rotation of shaft 27 and sprocket 33 due to engagement of the clutch member 32. If it is desired to stop movement of the truck and slow the same down, the brake band 41 is released and band 40 tightened. If it is desired to assist the movement of the truck the cable 43 mounted upon the other drum, which is identical in structure and operation as the drum 23, can be fixed to some stationary point disposed some distance ahead of the truck and upon operation of said drum which would be by the outer band 40, said cable will be wound in and thus help pull the truck along. It is to be noted, however, that if a single drum type of hoist is desired to be used, the same additional pulling effect may be had. Even with the double drum hoist, should it be desired to use only one drum both for driving the truck wheels and for pulling the truck along, such is accomplished by simply connecting the cable wound upon the drum 23 to some stationary point in front of the machine and then releasing both bands 40 and 41. The result is, an equalizing effect will be had between the sprocket 33 and the drum 23 to cause positive rotation of each so in case the wheels in coming up a steep grade should have a tendency to slip, said cable 43 will tend to pull the truck along. This mode of operation will thereby leave one drum perfectly free to use as desired. If it is now desired to totally release the truck chain drive, the clutch 32 is pulled out and the hoist is then ready to be used as a scraping mechanism such for instance as passing the cable wound upon the separate drums to cause actuation of the scrapers to load material into a mine car or other suitable receptacle. If necessary the hoist may obviously also be turned and locked in any lateral position to enable the material to be drawn laterally toward the track. During all of these loading operations, it is usually found necessary to positively anchor the truck against movement and this is readily accomplished by the use of the jacks 52 as before described.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. An apparatus comprising a wheeled truck, a unitary hoisting mechanism detachably mounted thereon including a motor, a winding drum, and driving connections between said motor and drum including a member adapted to be held stationary to effect driving of said drum or to be released to permit running of said motor while said drum remains stationary, the elements of said hoisting mechanism being joined together to form a unitary structure and said unitary structure being detachably carried by said truck, and means connectible at will to said member for driving the wheels of said truck.

2. An apparatus comprising a wheeled truck, a unitary hoisting mechanism mounted thereon including a motor, a winding drum, and driving connections between said motor and drum including a member adapted to be held stationary to effect driving of said drum or to be released to permit running of said motor while said drum remains stationary, and means for making a driving connection between the wheels of said truck and said member at the will of the operator and while said motor is running.

3. An apparatus comprising a wheeled truck, a unitary hoisting mechanism mounted thereon including a motor, a winding drum, and driving connections between said motor and drum including a member adapted to be held stationary to effect driving of said drum or to be released to permit running of said motor while said drum remains stationary, and means including a positive clutch member for making a driving connection between the wheels of said truck and said member.

4. An apparatus comprising a wheeled truck, a unitary hoisting mechanism mounted thereon including a motor, a winding drum, and driving connections between said motor and drum including a member adapted to be held stationary to effect driving of said drum or to be released to permit running of said motor while said drum remains stationary, the elements of said hoisting mechanism being joined together to form a unitary structure, means connectible at will to said member for driving the wheels of said truck or for releasing said mechanism from driving said truck and thereafter using said mechanism for hoisting purposes, and means for positively anchoring said truck during the hoisting operation.

5. An apparatus comprising a wheeled truck, a unitary hoisting mechanism swiveled thereon including a motor, a winding drum, and driving connections between said motor and drum including a member adapted to be held stationary to effect driving of said drum or to be released to permit running of said motor while said drum remains stationary, the elements of said hoisting mechanism being joined together to form a unitary structure, and clutch controlled driving connections operatively connecting said member and a truck wheel.

6. An apparatus comprising a wheeled truck, a unitary hoisting mechanism swiveled thereon including a motor, a winding drum, and driving connections between said motor and drum including a member adapted to be held stationary to effect driving of said drum or to be released to permit running of said motor while said drum remains stationary, the elements of said hoisting mechanism being joined together to form a unitary structure, and clutch controlled driving connections operatively connecting said member to a truck wheel including a sprocket arranged coaxially with said drum.

7. A portable hoisting apparatus comprising a wheeled truck, a reel rotatably mounted thereon about a relatively fixed axis and adapted to carry an energy conducting member, a unitary hoisting mechanism swiveled on said truck including a motor, a winding drum, and driving connections between said motor and drum including a member adapted to be held stationary to effect driving of said drum or to be released to permit running of said motor while said drum remains stationary, means connectible at will to said member for driving the wheels of said truck, and means for supplying energy to said motor from said conducting member on said reel in any swiveled position of said hoisting mechanism relative thereto.

8. A portable hoisting apparatus comprising a wheeled truck, a reel rotatably mounted thereon about a relatively fixed axis and adapted to carry an energy conducting member, a unitary hoisting mechanism swiveled on said truck including a motor, a winding drum, and driving connections between said motor and drum including a member adapted to be held stationary to effect driving of said drum or to be released to permit running of said motor while said drum remains stationary, means connectible at will to said member for driving the wheels of said truck when said hoisting mechanism is in one position, said hoisting mechanism being usable for lateral hoisting purposes when swiveled to another position, and means for supplying energy to said motor from said conducting member on said reel in any swiveled position of said hoisting mechanism relative thereto.

9. An apparatus comprising a wheeled truck, a unitary hoisting mechanism mounted thereon including a motor, a winding drum, and operative driving connections between said motor and drum including a member adapted to be held stationary to effect driving of said drum or to be released to permit running of said motor while said drum remains stationary, the elements of said hoisting mechanism being joined together to form a unitary structure and the position of said unitary structure being adjustable on said truck so that said structure may take either of two positions with the drum transverse to the truck, and means connectible to said member to drive the truck wheels when the hoisting mechanism is in either of said positions.

10. An apparatus comprising a wheeled truck, a unitary hoisting mechanism mounted thereon including a motor, a winding drum, and operative driving connections between said motor and drum including a member adapted to be held stationary to effect driving of said drum or to be released to permit running of said motor while said drum remains stationary, the elements of said hoisting mechanism being joined together to form a unitary structure and the position of said unitary structure being adjustable on said truck so that said structure may take either of two positions with the drum transverse to the truck, and means connectible to said member to drive the truck wheels when in either of said positions, said truck driving means driving said truck in an opposite direction when the position of the unitary hoisting mechanism is reversed.

11. In a portable hoist outfit, a wheeled truck having a horizontal plate thereon, a unitary hoisting mechanism swiveled on said plate and comprising a winding drum, a motor, and driving connections between said motor and drum including a frictionally controlled reaction member, and driving connections operatively connecting said reaction member and a truck wheel, said frictionally controlled reaction member also controlling truck movement.

12. In a portable hoist outfit, a wheeled truck having running gear, a unitary hoisting mechanism swiveled on said truck including a motor and a winding drum driven thereby and adapted to cooperate with flexible means to effect truck movement, and operator controlled gearing connecting said motor with said running gear and with said drum and alternatively operable to drive the latter.

13. An apparatus comprising a wheeled truck, a unitary hoisting mechanism swiveled thereon including a motor, a winding drum, a rotatable member, differential gearing operatively connecting said winding drum and rotatable member with said motor, and a pair of brakes for controlling the drive of said drum through said differential gearing, driving connections adapted to operatively connect said rotatable member with a truck wheel, and a haulage element cooperating with said drum for pulling said truck bodily along a trackway.

14. An apparatus comprising a wheeled truck, a unitary hoisting mechanism swiveled thereon including a motor, a winding drum, a rotatable member, differential gearing operatively connecting said winding drum and rotatable member with said motor and a brake cooperating with said rotatable member to hold the same stationary to effect driving of said drum or to release the same to permit running of said motor while said drum remains stationary, clutch controlled driving connections adapted to operatively connect said rotatable member with a truck wheel, and a haulage element cooperating with said drum for pulling said truck bodily along a trackway.

In testimony whereof I affix my signature.

CHARLES F. OSGOOD.

CERTIFICATE OF CORRECTION.

Patent No. 1,791,744.  Granted February 10, 1931, to

CHARLES F. OSGOOD.

It is hereby certified that error appears in the printed specification of the above numbered patent requiring correction as follows: Page 1, line 23, after the word "truck" strike out the comma and insert a period and the words . For instance, use may be made; same page, line 92, after the word "construction" insert a period, and line 93, for "as" read As; and that the said Letters Patent should be read with these corrections therein that the same may conform to the record of the case in the Patent Office.

Signed and sealed this 14th day of April, A. D. 1931.

M. J. Moore,
Acting Commissioner of Patents.

(Seal)